United States Patent
Breed et al.

(10) Patent No.: US 10,608,909 B2
(45) Date of Patent: Mar. 31, 2020

(54) NETWORK DATA AGGREGATION SYSTEM AND METHOD FOR BUILDING MANAGEMENT SYSTEMS

(71) Applicant: Tyco Safety Products Canada Ltd., Concord (CA)

(72) Inventors: Jason Breed, Richmond Hill (CA); Derek C. Smith, Maple (CA); Stephane Foisy, Udora (CA)

(73) Assignee: TYCO SAFETY PRODUCTS CANADA LTD., Ontario (CA)

( * ) Notice: Subject to any disclaimer, the term of this patent is extended or adjusted under 35 U.S.C. 154(b) by 24 days.

(21) Appl. No.: 16/007,562

(22) Filed: Jun. 13, 2018

(65) Prior Publication Data
US 2019/0386901 A1   Dec. 19, 2019

(51) Int. Cl.
| | |
|---|---|
| H04L 12/26 | (2006.01) |
| G08B 17/00 | (2006.01) |
| H04W 24/02 | (2009.01) |
| H04W 84/04 | (2009.01) |
| H04L 29/08 | (2006.01) |

(52) U.S. Cl.
CPC .......... *H04L 43/0811* (2013.01); *G08B 17/00* (2013.01); *H04W 24/02* (2013.01); *H04L 67/12* (2013.01); *H04W 84/042* (2013.01)

(58) Field of Classification Search
None
See application file for complete search history.

(56) References Cited

U.S. PATENT DOCUMENTS

| | | | | |
|---|---|---|---|---|
| 9,913,127 | B1* | 3/2018 | Polepalli ............... | H04W 8/183 |
| 2006/0183487 | A1* | 8/2006 | Allen ..................... | H04W 4/021 |
| | | | | 455/456.5 |
| 2007/0008099 | A1* | 1/2007 | Kimmel ................. | A62C 99/00 |
| | | | | 340/506 |
| 2007/0111748 | A1* | 5/2007 | Risbood ................ | H04W 24/06 |
| | | | | 455/550.1 |
| 2008/0085692 | A1* | 4/2008 | Hart ....................... | H04W 16/20 |
| | | | | 455/187.1 |
| 2009/0003219 | A1* | 1/2009 | Beacham ................ | H04L 43/00 |
| | | | | 370/241 |
| 2011/0131317 | A1* | 6/2011 | Sanders ................ | H04W 24/00 |
| | | | | 709/224 |
| 2011/0292822 | A1* | 12/2011 | Wood ..................... | H04L 43/08 |
| | | | | 370/252 |
| 2012/0276901 | A1* | 11/2012 | Kruglick ........... | H04W 36/0083 |
| | | | | 455/436 |

(Continued)

*Primary Examiner* — Joshua Joo
(74) *Attorney, Agent, or Firm* — Arent Fox, LLP (57) ABSTRACT

A network data aggregation system and method for connected building management systems are disclosed. The aggregation system assesses network connectivity for the building management system. For this purpose, the aggregation system includes building management control panels including modems for reporting to monitoring stations, and a customer management server (CMS). The control panels collect network connectivity information of the modems, and the CMS receives the network connectivity information. In one example, the CMS analyzes the network connectivity information to identify issues in service provider networks that provide connections between the modems of the building management control panels and the service provider networks.

23 Claims, 9 Drawing Sheets

(56) References Cited

U.S. PATENT DOCUMENTS

| | | | |
|---|---|---|---|
| 2013/0281044 A1* | 10/2013 | Smith | G08B 25/014 455/404.1 |
| 2014/0064258 A1* | 3/2014 | Montag | H04W 84/12 370/338 |
| 2014/0198670 A1* | 7/2014 | Mahasenan | H04W 24/00 370/252 |
| 2016/0335883 A1* | 11/2016 | Breed | G08B 29/18 |
| 2017/0061655 A1* | 3/2017 | Pylappan | G06T 11/00 |
| 2017/0223506 A1* | 8/2017 | Kim | H04W 64/00 |
| 2017/0325113 A1* | 11/2017 | Markopoulou | H04L 12/4641 |
| 2018/0049039 A1* | 2/2018 | Chandrasekaran | H04W 16/18 |
| 2018/0124614 A1* | 5/2018 | Jones | H04B 17/318 |
| 2018/0167861 A1* | 6/2018 | Kavoussi | H04W 4/24 |
| 2019/0281473 A1* | 9/2019 | Liao | H04W 48/20 |
| 2019/0342147 A1* | 11/2019 | O'Reirdan | H04W 24/04 |

\* cited by examiner

| Cellular Modem Table 92 | | | | | | | | | | | |
|---|---|---|---|---|---|---|---|---|---|---|---|
| user account number | Control Panel Physical Address | Control Panel type/ model number | Control panel Firmware Version | Cellular Modem Type | Cellular Service Provider ID | Historical Connection Type | Historical Signal Strength | Historical Connection uptime | Radio modem used (current) | Radio modem used (hist.) | Radio modem software version (current) | Radio modem software version (hist.) |
| ... | ... | ... | ... | ... | ... | ... | ... | ... | ... | ... | ... | ... | cellular modem data 102-1

| Control panel software version (current) | Control panel software version (hist.) | Antenna type used (current) | Antenna type used (hist.) | SIM Card Type | SIM Toolkit version | Hardware revisions |
|---|---|---|---|---|---|---|
| ... | ... | ... | ... | ... | ... | ... | cellular modem data 102-2

FIG. 5A cellular network table 94

| user account number | Service Provider/ Carrier (current) | Service Provider/ Carrier (hist) | Tower # (current) | Tower # (hist) | Channel Freq (current) | Channel Freq (hist) | Signal Strength (current) | Signal Strength (hist) | Bit error rate (current) | Bit error rate (hist) | next best channel/ carrier information | number of nearby towers |
|---|---|---|---|---|---|---|---|---|---|---|---|---|
| ... | ... | ... | ... | ... | ... | ... | ... | ... | ... | ... | ... | ... | cellular network data 104-1

· · ·

| Time/date of initial activation | Original cell technology | Current cell technology | historical cell technology logs | SIM toolkit version (current) | SIM toolkit version (historical) | Idle state duration |
|---|---|---|---|---|---|---|
| ... | ... | ... | ... | ... | ... | ... | cellular network data 104-2

NETWORK DATA AGGREGATION SYSTEM AND METHOD FOR BUILDING MANAGEMENT SYSTEMS

BACKGROUND OF THE INVENTION

Building management systems are often installed within premises such as commercial, residential, or governmental buildings. Examples of the types of building management systems include building automation systems, fire alarm systems and security systems, and integrated fire/security systems known as life safety systems, to name a few.

The fire alarm systems will typically include fire alarm control panels and distributed devices such as fire detection/initiation devices and alarm notification devices. The fire detection/initiation devices and alarm notification devices are installed throughout the buildings and connect to the fire alarm control panels typically through a wired and/or wireless safety and security network. Some examples of fire detection/initiation devices include smoke detectors, carbon monoxide detectors, flame detectors, temperature sensors, and/or pull stations (also known as manual call points). Some examples of alarm notification devices include speakers, horns, bells, chimes, light emitting diode (LED) reader boards, and/or flashing lights (e.g., strobes).

The fire detection devices monitor the buildings for indicators of fire. Upon detection of an indicator of fire such as smoke or heat or flames, the device is activated and alarm information is sent from the activated device over the safety and security network to the fire alarm control panels. The fire alarm control panels then activate audio and visible alarms of the fire notification devices of the fire alarm system. Additionally, the fire alarm control panels will also typically send the alarm information to a monitoring station.

A monitoring station will monitor fire alarm systems from multiple buildings for alarm information from the fire alarm control panels. The monitoring station receives the alarm information and then notifies the proper authorities, such as the local fire department.

In a similar vein, the security systems typically include security control panels and distributed devices such as monitoring devices and alarm notifications devices. The monitoring devices typically detect unauthorized access (e.g. burglary) at or within the building and send alarm information to the security control panels, which then activate the alarm notification devices. The monitoring devices of the security systems often include motion sensor devices, surveillance camera devices, window sensors, glassbreak sensors, and door controllers, to list a few examples, that communicate with the security control panels over a wired and/or wireless network. Additionally, the security control panels will also send alarm information to the monitoring station, which may then notify the police department.

Additionally, when the capabilities of fire alarm systems and security systems are integrated into a common life safety system, the building management control panel is referred to as a life safety panel.

Historically, the building control panels would transmit the alarm information to the monitoring stations via a plain old telephone system (POTS). Typically, there would be a dedicated or shared telephone line to enable the building control panels, such as the fire alarm control panels and/or the security control panels, to transmit the alarm information to the monitoring stations.

POTS, however can be unreliable. Storms can damage or bring down its telephone lines. Thieves/intruders can cut the telephone lines. In both cases, the control panels will not be able to send the alarm information to the monitoring stations.

Cellular networks are wireless networks of "cells" operated by a cellular service provider. Each cell covers a specific geographic area or region and includes one or more radio base stations. Each base station typically includes an antenna, a tower or supporting structure for the antenna, and communications transceiver equipment. The base stations enable wireless two-way communications between the base stations and wireless transceiver devices such as cellular modems and cellular phones.

Cellular service providers typically build and maintain their own cellular networks. Examples of cellular service providers include Verizon, T-Mobile, AT&T, and Sprint. The cellular networks of each service provider are also known as cellular service provider networks.

More recently, fixed cellular modems have been incorporated into or associated with the building management control panels. These devices either replace the telephone lines, or are in addition to these lines. When the control panels have cellular modems, the control panels send their alarm information to the monitoring stations through a cellular service provider network of a cellular service provider. The alarm information can then be transmitted from the cellular service provider network to the monitoring station, either as an internet protocol (IP) formatted message through the internet or dedicated IP connection or via POTS call.

SUMMARY OF THE INVENTION

The cellular networks to which the fixed cellular modems connect have issues that affect installation and repair of the cellular modems at the control panels. One issue is that because the cellular networks are maintained by different cellular service providers, each service provider has different coverage maps. "Cellular coverage maps" show levels of network connectivity in geographical areas/areas of interest served by the different cellular service providers. Moreover, these cellular networks may use different wireless protocols: CDMA (Code Division Multiple Access) versus GSM (Global System for Mobiles). As a result, when building management system installers are dispatched to a customer premises to install or repair the cellular modems, the installers must carry multiple service equipment products for the different wireless protocols and/or the different cellular service providers, and also must know the coverage maps for the different cellular service providers. This translates to increased costs and time to perform an installation of or repairs to a cellular modem of a control panel in a particular premises/location.

Another issue that affects installation and repair of the cellular modems at the control panels is that the coverage maps can quickly become out of date. As a result, the coverage maps often do not accurately reflect the true installation environment (e.g. level of connectivity provided by) the cellular networks. The coverage maps can become out of date due to momentary instability of the cellular service providers' networks, unplanned changes to address failure of or damage to the base stations, and planned changes to the cellular networks, in examples.

The cellular coverage maps can become out of date due to both unplanned and planned changes to the cellular networks of the cellular service providers. Unplanned changes include immediate replacement of damaged or improperly operating radio base stations. Planned changes, in contrast, are scheduled over the longer term to upgrade and evolve the cellular networks to use newer technologies. For example, the service providers engage in various migrations through different generations of wireless technology, such as from 2G to 3G, 3G to 4G, and 4G to 5G, while also retiring older generations of wireless technology. Moreover, the networks change as the cellular service providers add new radio base stations while possibly removing other base stations. In addition, changes to a first service provider network (e.g. harvesting of bandwidth frequencies, addition/removal of base stations) can adversely affect levels of connectivity for other service provider networks that use or share bandwidth of the first service provider network.

Out of date or otherwise invalid coverage maps create additional problems for the installers of the cellular modems. If the actual level of connectivity (e.g. signal level) provided by the nearest base station is significantly less than that indicated by the coverage map for that base station, in one example, the installers may have to install additional equipment for the cellular modem at the customer site. Here, the installer may be required to install a larger antenna for the cellular modem, or perhaps even a microcell at the customer site. A microcell is an amplifier that increases the signal strength of the signal transmitted by the antenna of the nearest base station, and thus increases the signal received by the cellular modem. In another example, the level of connectivity may be so insufficient that the installer may need to replace the existing cellular modem with a cellular modem for a different cellular service provider to ensure a proper signal level. This also increases time and cost.

An aggregation system for assessing network connectivity for building management systems is proposed. In the system, building management systems such as fire alarm systems and security systems are installed in residential homes and businesses in neighborhoods within a town or region. Each of the building management systems has a control panel and a modem at the control panel. Each building management control panel then collects network connectivity information concerning the network connections between the modems and the service provider networks to which the modems connect, and sends the network connectivity information to a customer management server (CMS) for storage, comparison and analysis.

In one embodiment, the service provider networks are cellular service provider networks including cells formed from radio base stations. Here, the network connectivity information includes cellular modem data and cellular network data. The cellular modem data concerns aspects of the cellular modems and aspects of the control panels in which the cellular modems are included. The cellular network data concerns cellular connectivity between the cellular modems and corresponding radio base stations of the cellular service provider networks. The cellular network data includes signal strength information, potentially along with other information. The control panels then report this network connectivity information to the CMS.

In examples, the control panels either periodically push the collected network connectivity information to the CMS, or the CMS periodically polls information is pulled from the panels for the information.

In another embodiment, the service provider networks are wired internet service provider (ISP) networks. Here, the network connectivity information concerns connectivity between wired modems of the control panels and the wired ISP networks. In general, according to one aspect, the invention features a method for assessing network connectivity for building management systems. In the method, building management control panels report alarm information to monitoring stations using modems, and the control panels collect network connectivity information of the modems. Also in the method, a customer management server receives and accesses the network connectivity information from the control panels.

Preferably, the building management control panels include fire alarm control panels and security control panels that report alarm information to the monitoring stations.

The customer management server stores the network connectivity information for each of the control panels, and analyzes the network connectivity information. In one example, the customer management server analyzes the network connectivity information to identify issues in service provider networks that provide connections between the modems of the building management control panels and the service provider networks.

Typically, the network connectivity information includes cellular modem data and cellular network data. The cellular modem data concerns aspects of cellular modems of the building management control panels and concerns aspects of the control panels. The cellular network data concerns cellular connections between cellular modems of the building management control panels and corresponding radio base stations of cellular service provider networks. In one example, the cellular network data includes signal strength information of the corresponding radio base stations.

The customer management server collects the network connectivity information and correlates it to physical addresses associated with each of the control panels to create cellular coverage maps for cellular service provider networks that provide connections between cellular modems of the building management control panels and the cellular service provider networks. The customer management server creates the cellular coverage maps for different cellular service providers.

The customer management server also compares the created coverage maps to existing coverage maps to guide equipment decisions for installers of the cellular modems and to identify potential network outages in the cellular service provider networks.

Additionally, the customer management server analyzes the network connectivity information to identify possible connectivity issues and equipment failures in cellular service provider networks that provide cellular connections between cellular modems of the building management control panels and the cellular service provider networks, and to identify trends in the cellular service provider networks.

In general, according to another aspect, the invention features an aggregation system for assessing network connectivity for building management systems. The aggregation system includes building management control panels and a customer management server. The building management control panels include modems for reporting to monitoring stations, and the control panels collect network connectivity information of the modems. The customer management server then receives the network connectivity information.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In general, a proposed aggregation system 100 assesses network connectivity for building management systems. The system 100 includes building management control panels and a customer management server. The building management control panels include modems for reporting to monitoring stations, and the control panels collect network connectivity information of the modems. The customer management server receives and accesses the network connectivity information from the control panels.

Figure 1A:
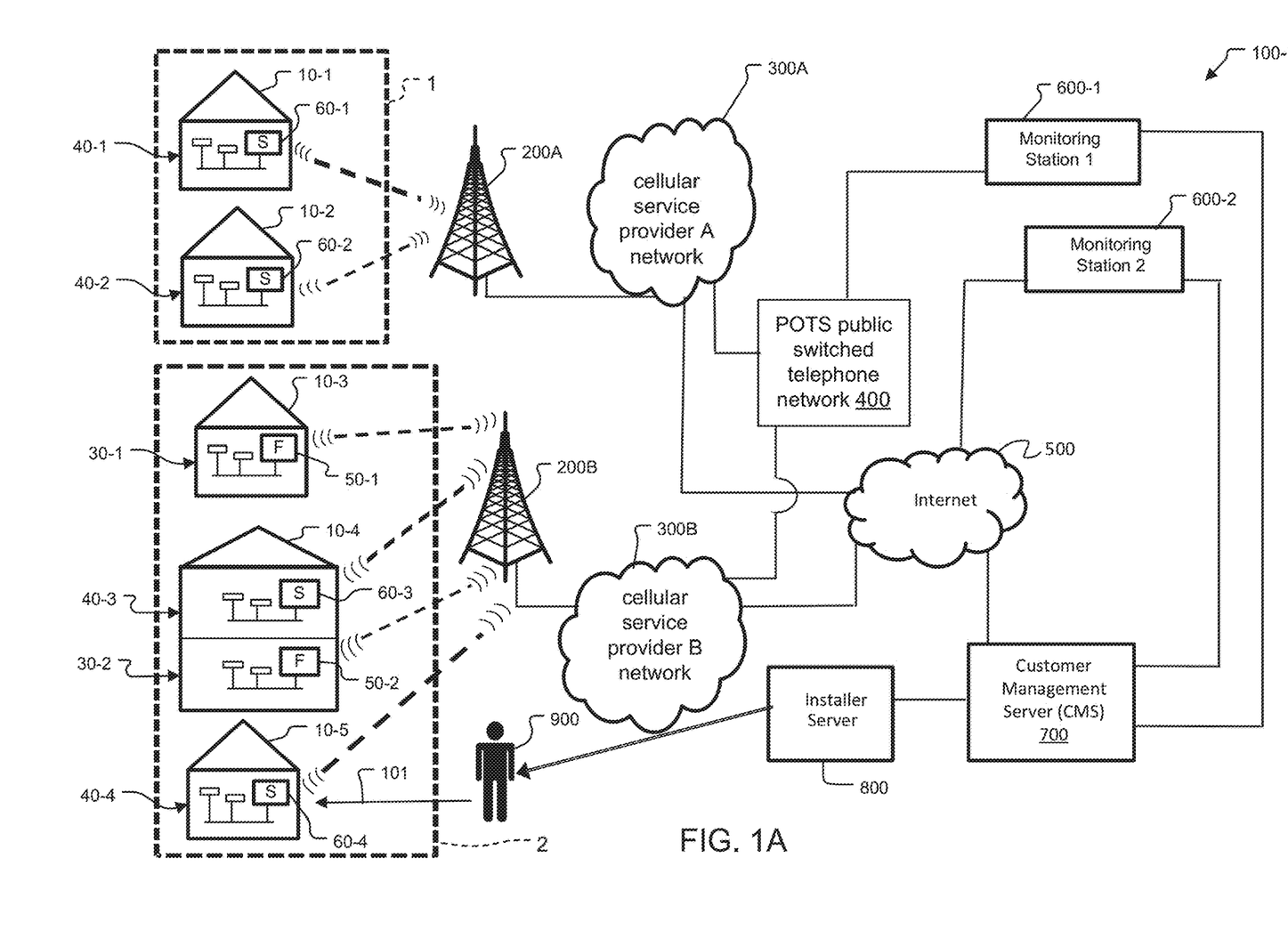
FIG. 1A is a schematic diagram showing a wireless aggregation system constructed in accordance with principles of the present invention, where the system includes building management systems such as security systems and fire alarm systems installed in homes of residential neighborhoods, each of the building management systems having a building management system control panel and a cellular modem at the control panel for communicating with cellular service provider networks.

FIG. 1A is a schematic diagram showing a wireless aggregation system 100-1.

The aggregation system 100-1 has various components. The aggregation system 100-1 includes cellular service provider networks 300, monitoring stations 600, a customer management server (CMS) 700, an installer server 800, and building management systems such as fire alarm systems 30 and security systems 40.

The fire alarm systems 30 and security systems 40 are installed within homes 10, and include building management control panels. Examples of building management control panels include fire alarm control panels 50 and security control panels 60 of the fire alarm systems 30 and security control panels 60, respectively. The homes 10, in turn, are located within neighborhoods 1, 2.

The control panels 50, 60 connect to cellular service provider networks to report alarm and status information to the monitoring stations 600. For this purpose, the cellular service provider networks provide both wireless (e.g. cellular) network connectivity to cellular modems at the control panels 50, 60, and also communicate with the monitoring stations 600. Base stations 200 of the cellular service provider networks 300 provide network connectivity to the cellular modems at the control panels 50, 60. The monitoring stations 600, in turn, connect to the cellular service provider network either via the internet 500 or a POTS public switched telephone network 400.

The control panels 50, 60 also provide network connectivity information concerning their respective cellular modems to the customer management server (CMS) 700. The CMS 700 stores the network connectivity information, typically based upon/indexed by the customer ID/customer site at which each control panel is installed. The CMS 700 also aggregates and assesses the network connectivity information.

In the illustrated example, cellular service provider networks 300A and 300B for separate cellular service providers A and B, respectively, are shown. Cellular service provider network 300A includes base station 200A and connects with both the internet 500 and the POTS public switched telephone network 400. Cellular service provider network 300B includes base station 200B and connects with both the internet 500 and the POTS public switched telephone network 400.

Cellular service provider network 300A provides network connectivity to neighborhood 1. Neighborhood 1 includes homes 10-1 and 10-2. Security system 40-1 is installed at home 10-1, and the security system 40-1 includes security control panel 60-1. In a similar vein, security system 40-2 is installed at home 10-2, and the security system 40-2 includes security control panel 60-2. Via base station 200A, cellular service provider network 300A provides wireless (i.e. cellular) network connectivity to cellular modems of security control panels 60-1 and 60-2.

Monitoring station 1, indicated by reference 600-1, monitors control panels 60-1 and 60-2 in neighborhood 1. Specifically, monitoring station 600-1 receives alarm information and status information from security control panels 60-1 and 60-2. Monitoring station 600-1 has a legacy telephony link that connects the monitoring station 600-1 to the POTS public switched telephone network 400, and also has a separate connection to the CMS 700.

Cellular service provider network 300B provides network connectivity to neighborhood 2. Neighborhood 2 includes homes 10-3, 10-4, and 10-5. Fire alarm system 30-1 is installed at home 10-1, and the fire alarm system 30-1 includes fire alarm control panel 50-1. Security system 40-3 and fire alarm system 30-2 are installed at home 10-4. The security system 40-3 and fire alarm system 30-2 include security control panel 60-3 and fire alarm control panel 50-2, respectively. Alternatively, the capabilities of security system 40-3 and fire alarm system 30-2 might be combined into a common life safety system controlled by a common life safety panel. Security system 40-4 is installed at home 10-3, and the security system 40-4 includes security control panel 60-4. Via base station 200B, cellular service provider network 300B provides network connectivity to cellular modems of security control panels 60-3 and 60-4, and fire alarm control panels 50-1 and 50-2.

Monitoring station 2, indicated by reference 600-2, monitors control panels 50-1, 50-2, 60-3 and 60-4 in neighborhood 1. Specifically, monitoring station 600-2 receives alarm information and status information from security control panels 60-3 and 60-4 and fire alarm control panels 50-1 and 50-2. Monitoring station 600-2 connects to the internet 500 and also has a separate connection to the CMS 700.

The CMS 700 connects to the monitoring stations 600, the internet 500, and to an installer server 800. In one implementation, an installer 900 accesses the CMS 700 directly. In another implementation, the CMS 700 provides a copy of information stored at the CMS 700 to the installer server 800. The information sent to the installer server 800 may also be a subset of the information stored at the CMS 700.

By way of example, reference 101 indicates that installer 900 is about to perform an installation (or repair/troubleshoot an existing installation) of a cellular modem of security control panel 60-4 at home 40-4. Here, the information available at the installer server 800 includes network connectivity information collected for customer site 40-4, and also typically includes network connectivity information for other customer sites 30-1, 30-2, and 40-3 in the same neighborhood 2.

Figure 1B:
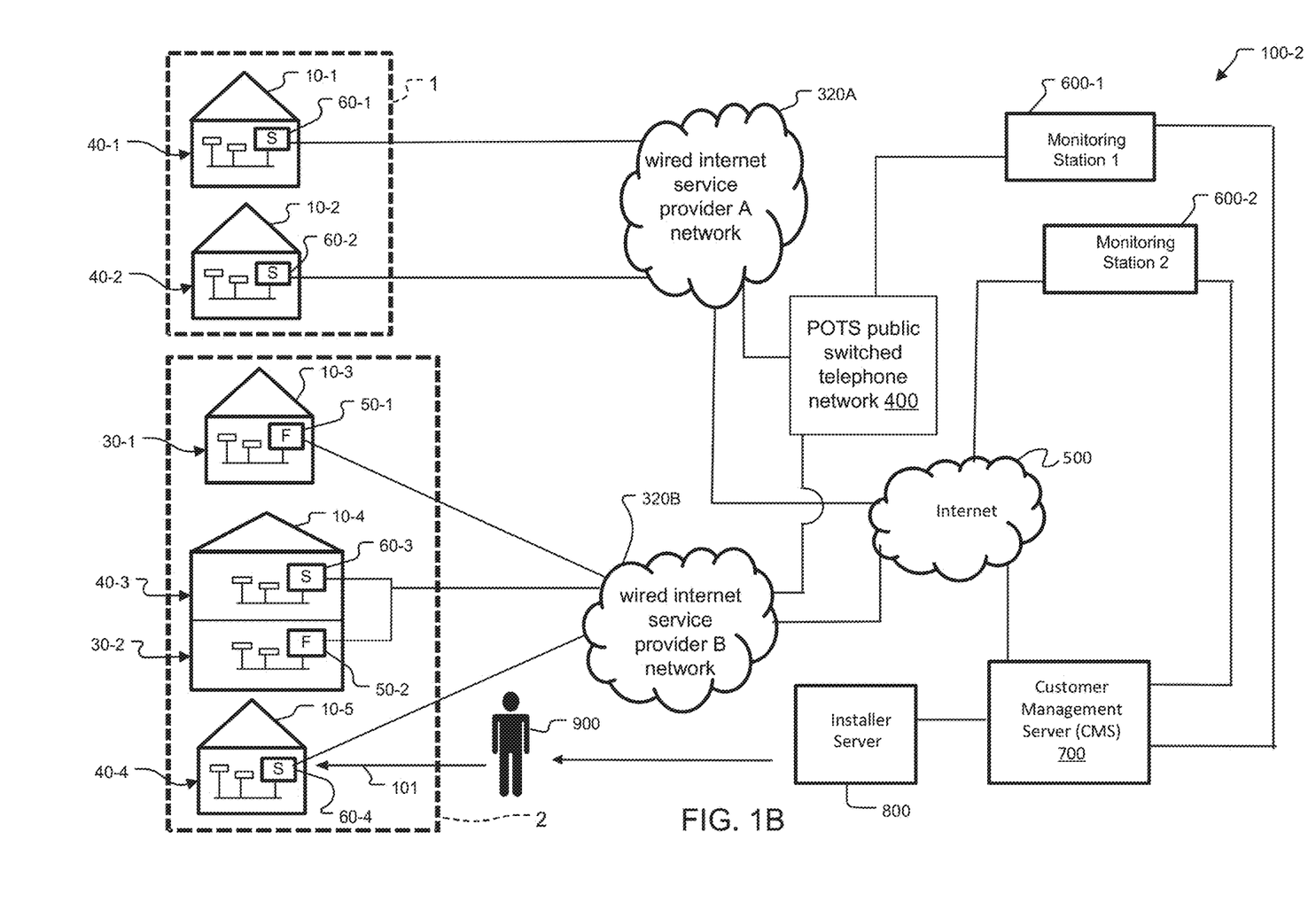
FIG. 1B is a schematic diagram showing a wired version of the aggregation system in FIG. 1A, where the wired aggregation system of FIG. 1B uses wired connections between wired internet service provider networks and wired modems at the control panels.

FIG. 1B is a schematic diagram showing a wired aggregation system 100-2. The aggregation system 100-2 includes similar components and operates in substantially a similar fashion as the wireless/cellular aggregation system 100-1 in FIG. 1A.

In more detail, the neighborhoods 1, 2 in FIG. 1B include the same customer sites/homes 10 and building management systems within the homes 10 as in FIG. 1A. The monitoring stations 600-1 and 600-2 also connect to the CMS 700 and the POTS public switched telephone network 400 and the internet 500 in the same way as in FIG. 1A. However, the cellular service provider networks 300A and 300B of FIG. 1A are instead replaced in FIG. 1B with wired internet service provider (ISP) networks 320A and 320B, respectively.

Specifically, wired ISP network 320A provides high-bandwidth wired links such as broadband cable and fiber links to connect security control panels 60-1 and 60-2 to the wired ISP network 320A. As a result, the control panels 60-1 and 60-2 can communicate with monitoring station 600-1, the internet 500, and the CMS 700. In a similar fashion, wired ISP network 320B provides high-bandwidth wired links to connect security control panels 60-3 and 60-4 and fire alarm control panels 50-1 and 50-2 to the wired ISP network 320B. As a result, the control panels 50-1, 50-2, 60-3, and 60-4 can communicate with monitoring station 600-2, the internet 500, and the CMS 700.

Figure 2A:
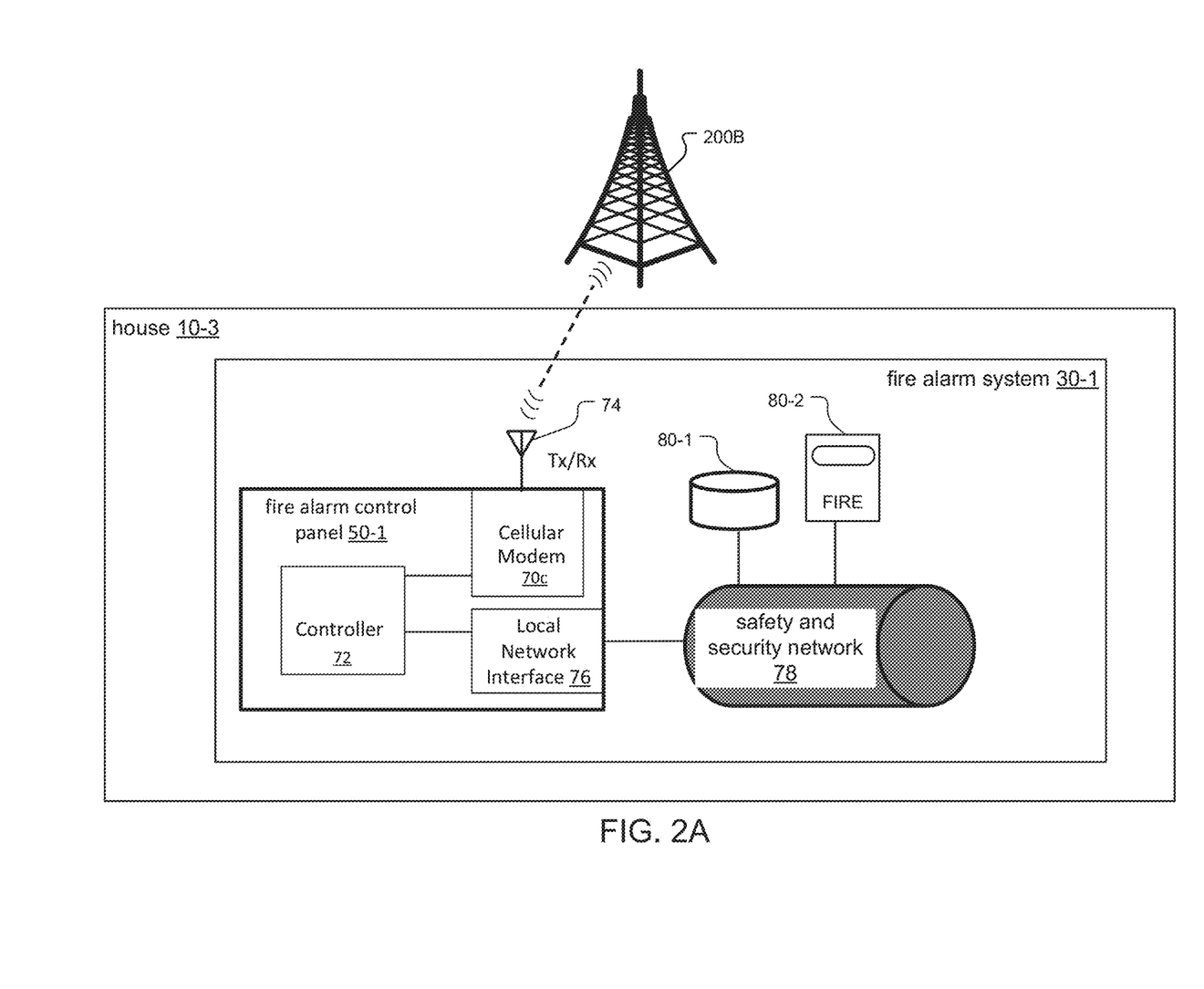
FIG. 2A is a schematic diagram showing more detail for a fire alarm system installed at a house in FIG. 1A, where a wireless connection between a cellular modem at a fire alarm control panel of the fire alarm system and a base station of a cellular service provider network is also shown.

FIG. 2A is a schematic diagram showing more detail for fire alarm system 30-1 installed at house 10-3 in FIG. 1A.

Fire alarm system 30-1 includes fire alarm control panel 50-1 and distributed devices 80-1 and 80-2 that communicate over a safety and security network 78.

The fire alarm control panel 50-1 includes a controller 72, a cellular modem 70c with an antenna 74, and a local network interface 76. Via its antenna 74, the cellular modem 70c enables two-way network connectivity with base station 200B. Local network interface 76 connects the fire alarm control panel 50-1 to the safety and security network 78.

The cellular modem 70c and the local network interface 76 are under control of the controller 72. In one implementation, the controller 72 instructs the cellular modem 70c to "push" network connectivity information concerning the wireless/cellular connection between the modem 70c and the base station 200A to the CMS 700. In another implementation, the controller 72 receives requests from the CMS 700 (such as via polling) to provide the network connectivity information, and the controller 72 sends the network connectivity in response.

Two distributed devices that communicate over the safety and security network are shown. The devices include a smoke detector 80-1 and a strobe alarm notification device 80-2. The smoke detector 80-1 provides alarm and status information over the safety and security network 78 to the control panel 50-1 via its local network interface 76. In response, the controller 72 forwards the alarm and status information to monitoring station 600-2 via a communications path formed from the cellar modem 70c/base station 200B/internet 500.

Figure 2B:
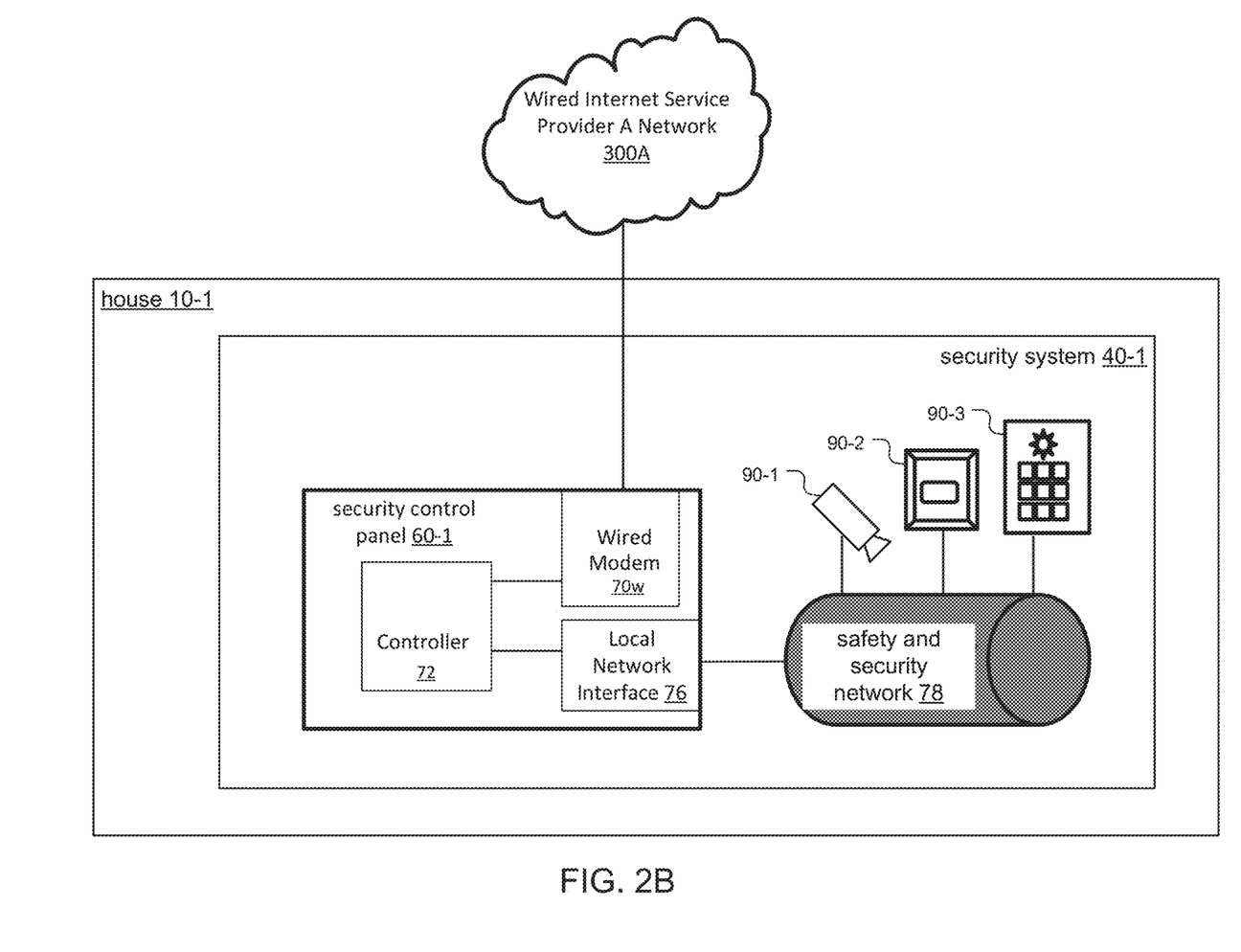
FIG. 2B is a schematic diagram showing more detail for a security system installed at a house in FIG. 1B, where a wired connection between a wired modem at a security panel of the security system and a wired internet service provider network is also shown.

FIG. 2B is a schematic diagram showing more detail for security system 40-1 installed at house 10-2 in FIG. 1B.

Security system 40-1 includes security control panel 60-1 and distributed devices 80-1, 80-2, and 80-3 that communicate over a safety and security network 78.

The security control panel 60-1 includes a controller 72, a wired modem 70w and a local network interface 76. A wired connection between the wired modem 70w and wired ISP network 320A enables two-way network connectivity between the wired modem 70w and the wired ISP network 300A. Local network interface 76 connects the security control panel 60-1 to the safety and security network 78.

The wired modem 70*w* and the local network interface 76 are controlled by the controller 72. The wired modem 70*w* communicates network connectivity information in a similar fashion as that described for the cellular modem 70*c* in FIG. 2A.

Three distributed devices that communicate over the safety and security network are shown. The devices include a surveillance camera device 90-1, a window sensor 90-2, and a door controller 90-3. The devices 90 provides alarm and status information over the safety and security network 78 to the control panel 60-1 via its local network interface 76. In response, the controller 72 forwards the alarm and status information to monitoring station 600-2 via a communications path formed from the wired modem 70*w*/wired ISP network 320A/POTS public switched telephone network 400.

Figure 3:
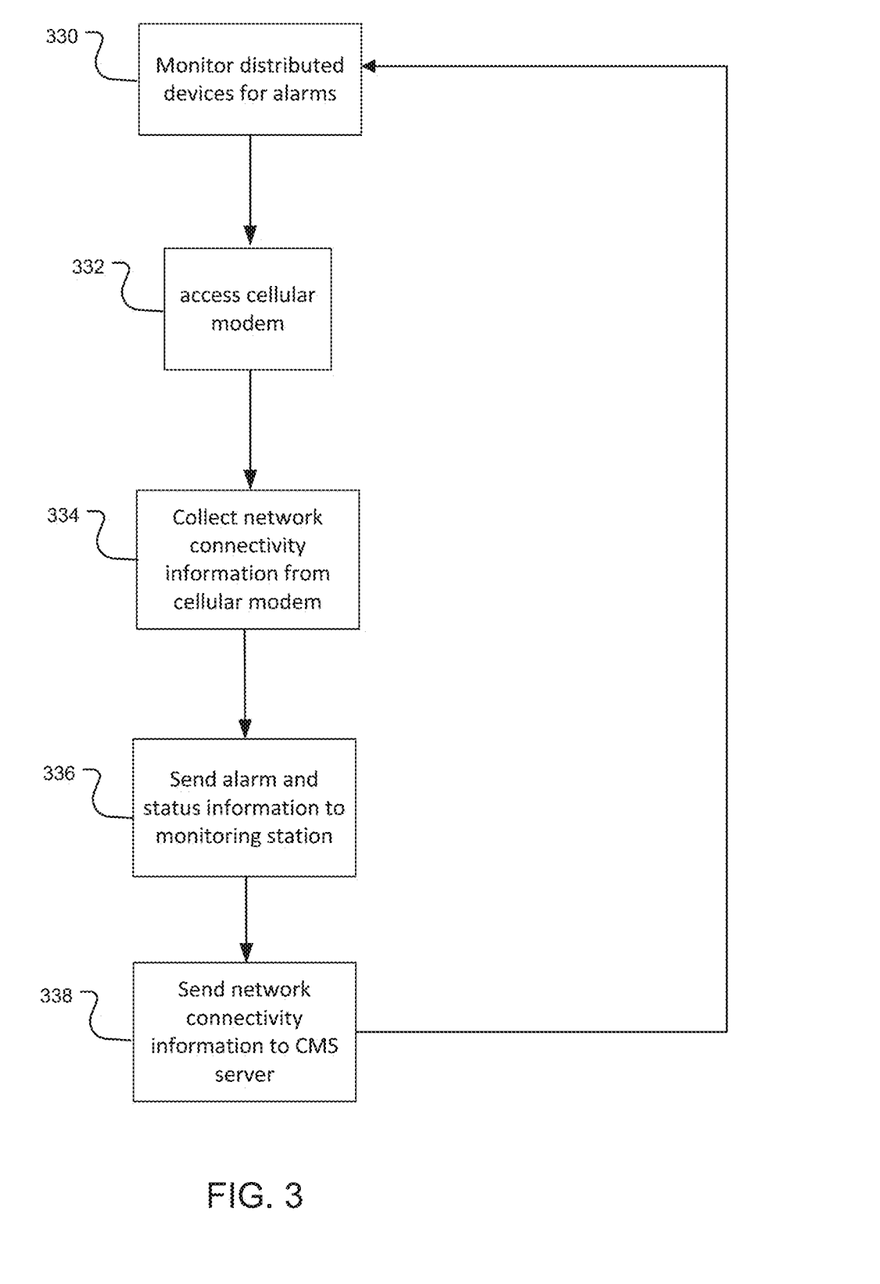
FIG. 3 is a flow diagram showing a method of operation for the fire alarm control panel of the fire alarm system in FIG. 2A.

FIG. 3 is a flow diagram showing a method of operation for fire alarm control panel 50-1 of fire alarm system 30-1 in FIG. 2A.

In step 330, the fire alarm control panel 50-1 monitors its distributed devices 80 for alarms. In step 332, the control panel 50-1 accesses cellular modem 70*c*. According to step 334, the control panel 50-1 collects network connectivity information from the cellular modem 70*c*. In step 336, the control panel 50-1 sends alarm information and status information to monitoring station 600-1. In examples, the status information includes supervisory signals.

Then, in step 338, the control panel 50-1 sends the network connectivity information to the CMS server 700. The method then transitions back to step 330 to monitor the distributed devices for new alarms.

Figure 4:
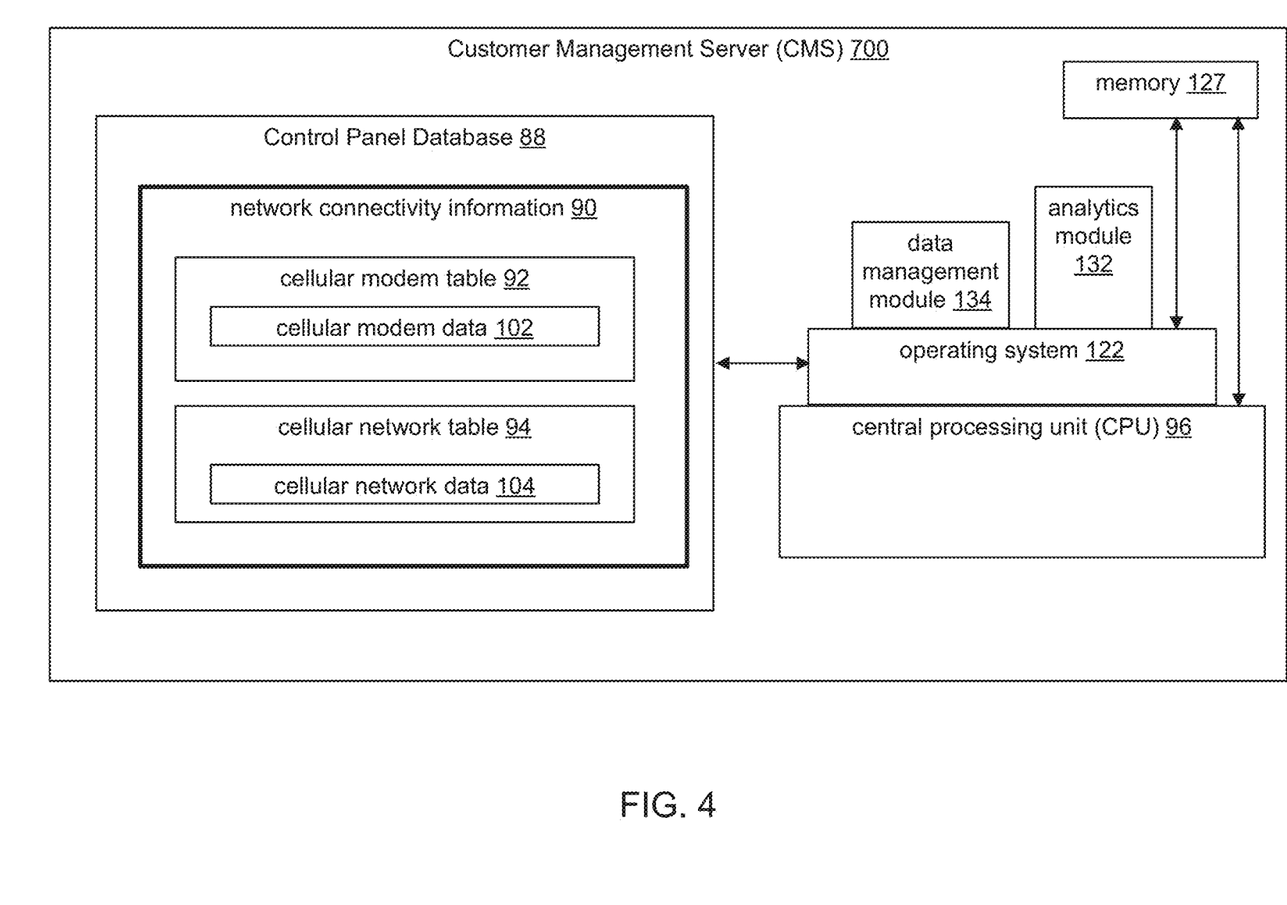
FIG. 4 is a block diagram showing detail for a customer management server (CMS) in the wireless aggregation system of FIG. 1A, where a control panel database of installed control panels is also shown.

FIG. 4 is a block diagram showing more detail for the CMS 700 in the wireless aggregation system 100-1 of FIG. 1A.

The CMS 700 has various components. These components include a control panel database 88, a central processing unit (CPU) 96, an operating system 122, and a memory 127. The operating system 122 executes on the CPU 96. Various applications such as a data management module 134 and an analytics module 132 execute on the CPU 96 with assistance from the operating system 122 and use the memory 127.

The control panel database 88 stores network connectivity information 90 sent to the CMS 700 from control panels 50, 60. The network connectivity information 90 is stored in a cellular modem table 92 and a cellular network table 94.

In more detail, the cellular modem table 92 includes cellular modem data 102, and the cellular network table 94 includes cellular network data 104. The cellular modem data 102 concerns aspects of the cellular modems 70*c* and aspects of the control panels 50, 60 within which the cellular modems 70*c* are included. The cellular network data 104 concerns cellular connections between radio base stations 200 of the cellular service provider networks 300 and the cellular modems 70*c*.

It can also be appreciated that the CMS 700 can store and analyze network connectivity information 90 collected from wired modems 70*w* of control panels 50, 60 in the wired aggregation system 100-2 of FIG. 1B.

In general, the CMS 700 receives network connectivity information 90 sent from modems 70 of building management system control panels. The analytics module 132 analyzes the network connectivity information 90 to identify issues in service provider networks that provide connections between the modems 70 of the building management control panels and the service provider networks.

Figure 5A:
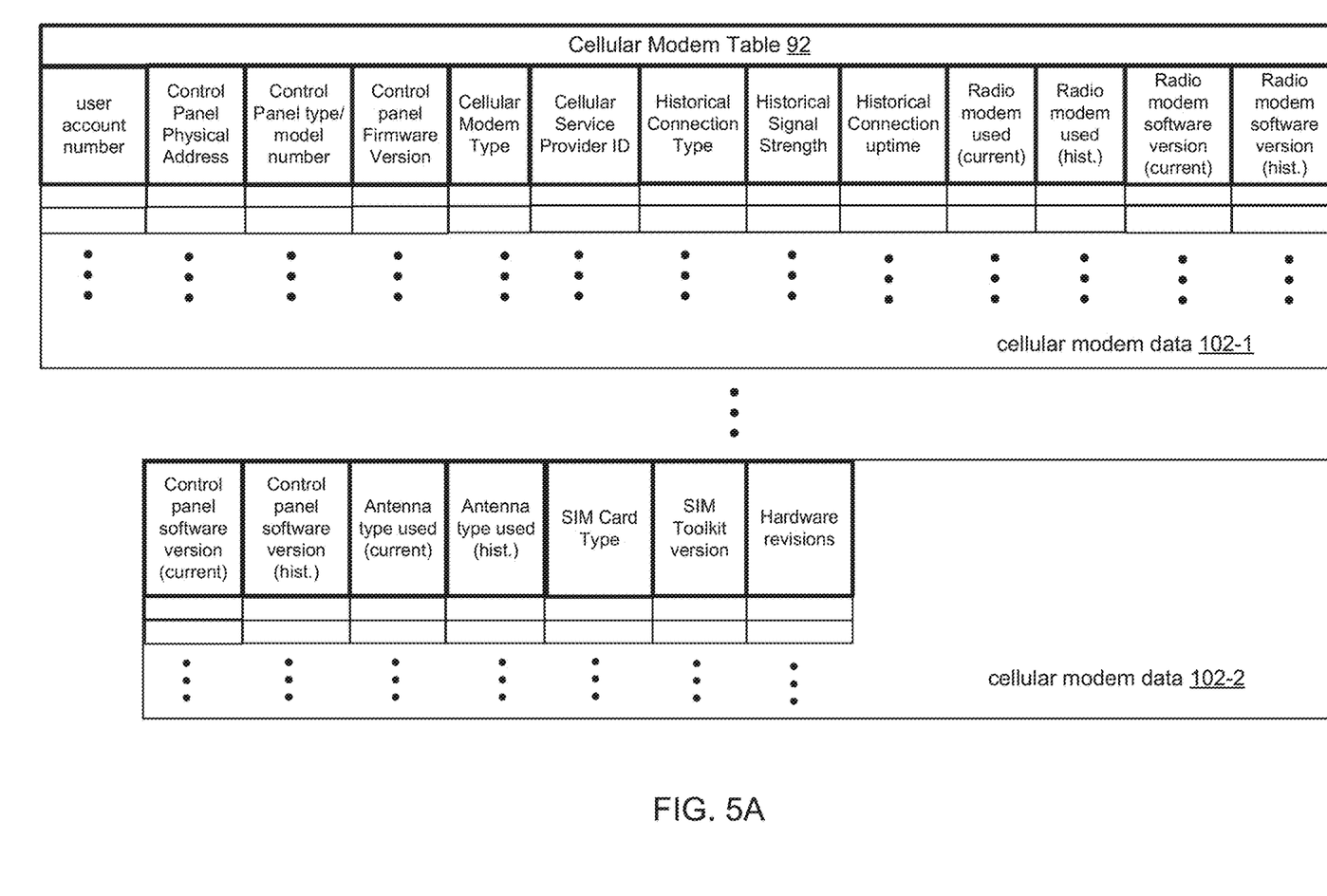
FIG. 5A is a diagram showing detail for network connectivity information stored in the control panel database of FIG. 4, where exemplary contents of a cellular modem table of the network connectivity information is shown.

FIG. 5A shows detail for the cellular modem table 92 in FIG. 4 and its cellular modem data 102.

In the illustrated example, separate rows are maintained within the cellular modem table 92 for each customer site/customer. Each row is indexed by the user account number for each customer. The cellular modem data 102 within each row is separated into two portions, cellular modem data 102-1 and 102-2 to facilitate the presentation and description of individual fields within each row.

Exemplary fields of information within the cellular modem data 102-1 of each row include: the user account number, which also services as an index; a control panel physical address, model number/type, and firmware version; a cellular modem type and cellular service provider ID; a historical connection type and historical signal strength of the radio base station corresponding to the cellular modem 70*c* of each row; a historical connection uptime; a radio modem used, both current and historical; and a radio modem software version, both current and historical.

Exemplary fields of information within the cellular modem data 102-2 of each row include: a control panel software version, both current and historical; an antenna type used, both current and historical; a SIM card type; a SIM toolkit version; and hardware revisions. For the antenna type, various information including its make/model, whether it is an internal or external antenna, and/or its mounting location might be stored.

Figure 5B:
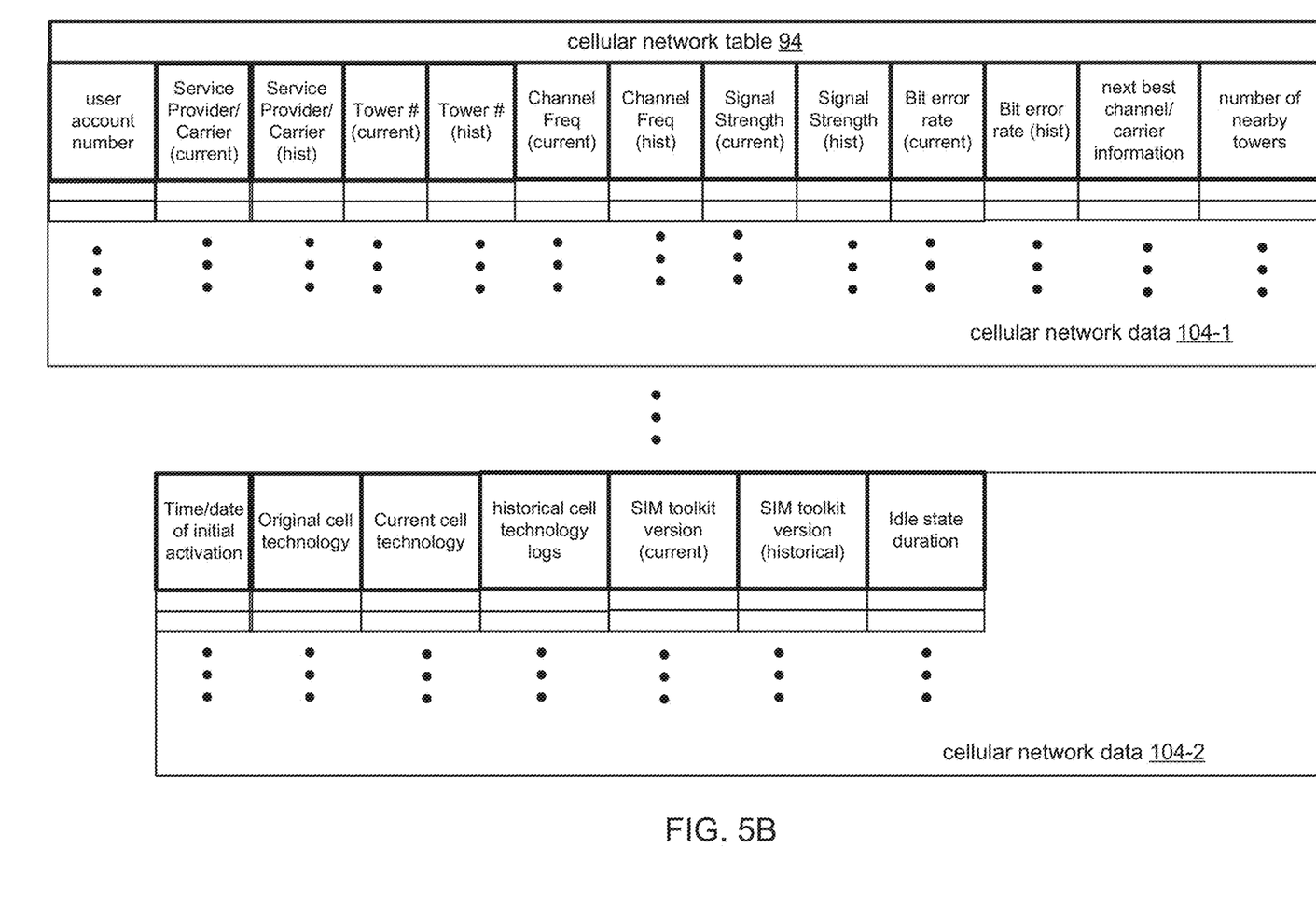
FIG. 5B is a diagram that also shows detail for the network connectivity information stored in the control panel database of FIG. 4, where exemplary contents of a cellular network table of the network connectivity information is shown.

FIG. 5B shows detail for the cellular network table 94 in FIG. 4 and its cellular network data 104 that can be collected to aid in the installed control panel/modem coverage review.

In the illustrated example, separate rows are maintained within the cellular network table 94 for each customer site/customer. Each row is indexed by the user account number for each customer. The cellular network data 104 within each row is separated into two portions, cellular modem data 104-1 and 104-2 to facilitate the presentation and description of individual fields within each row.

Exemplary fields of information within the cellular network data 104-1 of each row include: the user account number, which also services as an index; a service provider/carrier name (e.g. AT&T, Sprint, Rogers), both current and historical; a tower #, both current and historical; a channel (frequency), both current and historical; a signal strength (e.g. RSSI, CSQ), both current and historical; a bit error rate, both current and historical; and a next best channel/Carrier information field; and a Number of towers that are nearby.

Exemplary fields of information within the cellular network data 104-2 of each row include: a time/date of initial unit activation; cell technology, both original and current; historical cell technology logs; a SIM toolkit version, both current and historical; and an idle state duration.

Figure 6:
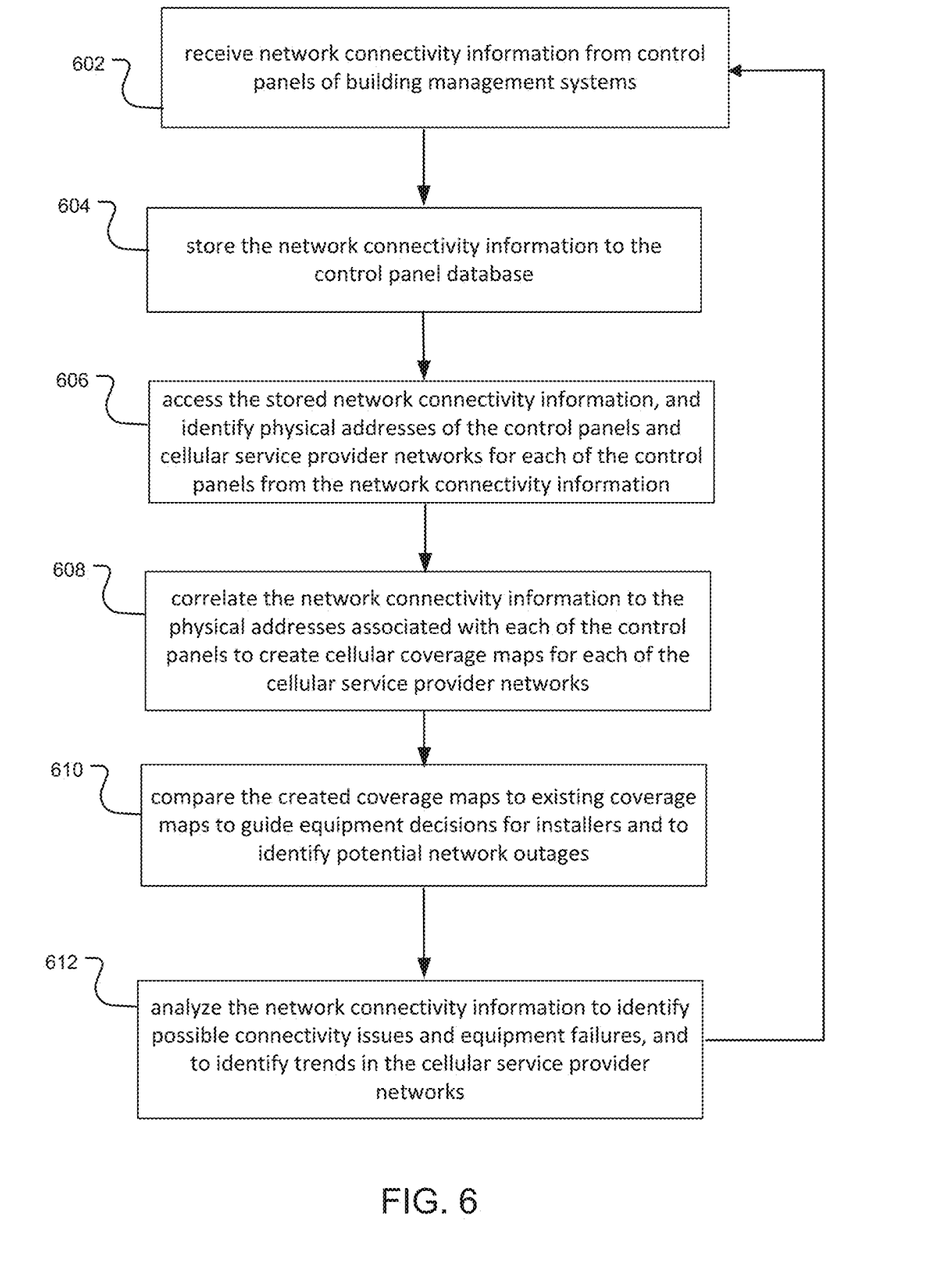
FIG. 6 is a flow chart that shows a method of operation for the CMS.

FIG. 6 is a flowchart showing a method of operation for the CMS 700 in the wireless aggregation system 100-1 of FIG. 1A.

In step 602, the data management module 134 of the CMS 700 receives network connectivity information 90 from control panels of building management systems. According to step 604, the data management module 134 stores the network connectivity information 90 to the control panel database 88.

In step 606, the analytics module 132 of the CMS 700 accesses the stored network connectivity information 90 from the database 88, and identifies physical addresses of the control panels and cellular service provider networks for each of the control panels from the network connectivity information 90. In one example, the analytics module 132 identifies physical addresses of the control panels via the "control panel physical address" field of rows within the cellular modem table 92, and identifies the cellular service provider networks via the "service provider/carrier" (both current and historical) fields of rows within the cellular network table 104.

Then, in step 608, the analytics module 132 correlates the network connectivity information 90 to the physical addresses associated with each of the control panels to create cellular coverage maps for each of the cellular service provider networks.

According to step 610, the analytics module 132 compares the created coverage maps to existing coverage maps to guide equipment decisions for installers 900 of the cellular modems 70c and to identify potential network outages in the cellular service provider networks 300.

In more detail, based upon the network connectivity information 90, the analytics module 132 can build a map of network characteristics for town density, signal strength and the common technology that is used in a region. From this information, guidance can be provided to the customers and installers in order to select the right product/technology for the installation, before the installer is dispatched to the customer site. The network connectivity information 90 can also be analyzed to track a localized network outage before the cellular service provider publishes this information.

According to step 612, the analytics module 132 analyzes the network connectivity information 90 to identify/troubleshoot potential connectivity issues and equipment failures in the cellular service provider networks 300, and to identify trends in the cellular service provider networks 300.

The analysis in step 612 can take different forms.

Troubleshooting based on trending data, for example, will make it possible to identify specific wireless technologies or radio base stations that are currently having issues. Historical signal strength information of the network connectivity information (e.g. signal levels, error rates) can be compared to more recent signal strength information of the network connectivity information to anticipate changes in signal levels that will cause issues in the near future.

This analysis can also be expanded to perform security checks upon the base stations based on failed communications. For example, if a cellular modem no longer reports to a base station, a monitoring service within the cell could review the coverage map for that base station to determine the area of coverage provided by the tower of the base station to determine whether this is an isolated event or indicates that an entire area is affected.

The proposed aggregation system 100-1 could also be used to collect information over time to provide report maps on units/technology for different radio base stations 200 and any potential impact of changing network topology, such as network turn down and outages, in examples. Information such as which frequency bands are used would also be collected to help determine if frequency carve outs for other technologies would impact the performance of the sites. In yet another example, based upon near real time data collected by the CMS 700 from nearby installed control panels, it could be determined whether a customer site uses microcells.

In yet another example, when the signal level from a particular base station 200 in a given region changes drastically, the data can be analyzed to determine if there is a trend with surrounding base stations 200. For example, the analytics module 132 might determine that the current signal level of a base station 200 nearest to a specific cellular modem 70c has changed significantly, as compared to the historical signal strength stored for that cellular modem 70c (within the cellular modem data 102). In response, using algorithms such as artificial intelligence algorithms upon the network connectivity information 90, the analytics module 132 might identify all other radio base stations 200 within the same cell as the nearest base station 200, and compare the current signal levels of the other base stations 200 to their historical signal levels.

In still another example, the analytics module 132 can access the network connectivity information 90 for all control panels in a neighborhood, and analyze the signal quality of the cellular connections between the cellular modems 70c of the control panels and the cellular service provider networks 300. The analytics module 132 can prepare and sent a report to the installer 900 that includes the wireless technologies and/or cellular service providers used in that neighborhood that provide the best signal quality.

Upon completion of step 612, the method transitions back to step 602 to receive additional network connectivity information from control panels of the building management systems.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for assessing network connectivity for building management systems, comprising:
   building management control panels reporting alarm information to monitoring stations using modems;
   the building management control panels collecting network connectivity information of the modems;
   a customer management server receiving and accessing the network connectivity information of the modems from the building management control panels;
   the customer management server identifying physical addresses stored in a field of rows in a table in association with each of the building management control panels;
   the customer management server correlating the network connectivity information of the modems to the physical addresses to create a report comprising a connectivity map; and
   the customer management server sending the report comprising the connectivity map to an installer of the modems.

2. The method of claim 1, wherein the building management control panels comprise fire alarm control panels that report the alarm information to the monitoring stations.

3. The method of claim 1, wherein the building management control panels comprise security control panels that report the alarm information to the monitoring stations.

4. The method of claim 1, further comprising:
   the customer management server storing the network connectivity information for each of the building management control panels.

5. The method of 1, further comprising:
   the customer management server analyzing the network connectivity information to identify issues in service provider networks that provide connections between the modems of the building management control panels and the service provider networks.

6. The method of claim 1, wherein the network connectivity information comprises cellular modem data that concerns aspects of cellular modems of the building management control panels and that concerns aspects of the building management control panels.

7. The method of claim 1, wherein the modems comprise cellular modems, the method further comprising:
the customer management server collecting the network connectivity information and correlating the network connectivity information to the physical addresses associated with each of the building management control panels to create cellular coverage maps for cellular service provider networks that provide cellular connections between the cellular modems of the building management control panels and the cellular service provider networks.

8. The method of claim 7, further comprising:
the customer management server creating the cellular coverage maps for different cellular service providers.

9. The method of claim 7, further comprising:
the customer management server comparing the cellular coverage maps to existing coverage maps to guide equipment decisions for the installer of the cellular modems and to identify potential network outages in the cellular service provider networks.

10. The method of claim 1, wherein the network connectivity information comprises cellular network data concerning cellular connections between cellular modems of the building management control panels and corresponding radio base stations of cellular service provider networks.

11. The method of claim 10, wherein the cellular network data comprises signal strength information of the corresponding radio base stations.

12. The method of claim 1, wherein the modems comprise cellular modems, the method further comprising:
the customer management server analyzing the network connectivity information to identify possible connectivity issues and equipment failures in cellular service provider networks that provide cellular connections between the cellular modems of the building management control panels and the cellular service provider networks, and to identify trends in the cellular service provider networks.

13. An aggregation system for assessing network connectivity for building management systems, comprising:
building management control panels including modems for reporting alarm information to monitoring stations, the building management control panels collecting network connectivity information of the modems;
a customer management server receiving and accessing the network connectivity information of the modems from the building management control panels;
the customer management server identifying physical addresses stored in a field of rows in a table in association with each of the building management control panels;
the customer management server correlating the network connectivity information of the modems to the physical addresses to create a report comprising a connectivity map; and
the customer management server sending the report comprising the connectivity map to an installer of the modems.

14. The aggregation system of claim 13, wherein the building management control panels include fire alarm control panels that report fire alarm information to the monitoring stations.

15. The aggregation system of claim 13, wherein the building management control panels include security control panels that report the alarm information to the monitoring stations.

16. The aggregation system of claim 13, wherein the customer management server stores the network connectivity information for each of the building management control panels.

17. The aggregation system of claim 13, wherein the customer management server includes an analytics module that analyzes the network connectivity information to identify issues in service provider networks that provide connections between the modems of the building management control panels and the service provider networks.

18. The aggregation system of claim 13, wherein the modems comprise cellular modems, wherein the network connectivity information includes cellular modem data that concerns aspects of the cellular modems of the building management control panels and that concerns aspects of the building management control panels.

19. The aggregation system of claim 18, wherein the customer management server collects the network connectivity information and correlates the network connectivity information to the physical addresses associated with each of the building management control panels to create cellular coverage maps.

20. The aggregation system of claim 19, wherein the customer management server creates the cellular coverage maps for different cellular service providers.

21. The aggregation system of claim 19, wherein the customer management server compares the cellular coverage maps to existing coverage maps to guide equipment decisions for the installer of the cellular modems and to identify potential network outages in cellular service provider networks.

22. The aggregation system of claim 13, wherein the modems comprise cellular modems, wherein the network connectivity information includes cellular network data concerning cellular connections between the cellular modems of the building management control panels and corresponding radio base stations of cellular service provider networks.

23. The aggregation system of claim 13, wherein the modems comprise cellular modems, wherein the customer management server includes an analytics module that analyzes the network connectivity information to identify possible connectivity issues and equipment failures in cellular service provider networks that provide cellular connections between the cellular modems of the building management control panels and the cellular service provider networks, and to identify trends in the cellular service provider networks.

* * * * *